US008599063B2

(12) United States Patent
Hino et al.

(10) Patent No.: US 8,599,063 B2
(45) Date of Patent: Dec. 3, 2013

(54) ANTENNA DEVICE AND RADAR APPARATUS

(75) Inventors: Akihiro Hino, Nishinomiya (JP); Koji Atsumi, Nishinomiya (JP)

(73) Assignee: Furuno Electric Company Limited, Nishinomiya, Hyogo-Pref. (JP)

( * ) Notice: Subject to any disclaimer, the term of this patent is extended or adjusted under 35 U.S.C. 154(b) by 252 days.

(21) Appl. No.: 12/915,844

(22) Filed: Oct. 29, 2010

(65) Prior Publication Data

US 2011/0102239 A1 May 5, 2011

(30) Foreign Application Priority Data

Oct. 30, 2009 (JP) ................................ 2009-251052

(51) Int. Cl.
*G01S 13/00* (2006.01)
*H01Q 13/10* (2006.01)
*H01Q 9/16* (2006.01)

(52) U.S. Cl.
USPC ........... 342/175; 343/767; 343/770; 343/771; 343/793

(58) Field of Classification Search
USPC .......... 342/175; 343/762, 767, 770–772, 774, 343/786
See application file for complete search history.

(56) References Cited

U.S. PATENT DOCUMENTS 3,230,483 A * 1/1966 Kinsey .......................... 333/114
3,325,816 A * 6/1967 Dutton .......................... 343/777
3,698,000 A * 10/1972 Landry et al. ................. 343/772
3,720,953 A * 3/1973 Ajioka .......................... 343/771
4,097,868 A * 6/1978 Borowick ..................... 343/727
4,298,876 A * 11/1981 Crochet ........................ 343/756
4,464,554 A * 8/1984 Bakanowski et al. ......... 219/748
4,853,704 A * 8/1989 Diaz et al. ..................... 343/767
4,885,592 A * 12/1989 Kofol et al. ................... 343/754
5,173,714 A * 12/1992 Arimura et al. ............... 343/771
5,177,496 A * 1/1993 Arimura et al. ............... 343/771
5,289,200 A * 2/1994 Kelly ............................ 343/771
5,400,042 A * 3/1995 Tulintseff ..................... 343/727
5,461,392 A * 10/1995 Mott et al. .................... 343/725
5,467,100 A * 11/1995 Chen ............................ 343/770
5,579,019 A * 11/1996 Uematsu et al. .............. 343/771
5,596,336 A * 1/1997 Liu .............................. 343/770
5,612,702 A * 3/1997 Kinsey .......................... 342/427
5,638,079 A * 6/1997 Kastner et al. ................ 343/770
5,705,967 A * 1/1998 Pirard ........................... 333/237
5,977,924 A * 11/1999 Takei et al. ................... 343/770
6,166,701 A * 12/2000 Park et al. ..................... 343/771
6,201,507 B1 * 3/2001 Park et al. ..................... 343/771
6,304,228 B1 * 10/2001 Smith et al. ................... 343/771
6,317,094 B1 * 11/2001 Wu et al. ....................... 343/767
6,501,415 B1 * 12/2002 Viana et al. ..................... 342/27
6,762,730 B2 * 7/2004 Schadler ....................... 343/770

(Continued)

FOREIGN PATENT DOCUMENTS

JP 2005-73212 A 3/2005

*Primary Examiner* — Jack W Keith
*Assistant Examiner* — Peter Bythrow
(74) *Attorney, Agent, or Firm* — Birch, Stewart, Kolasch & Birch, LLP

(57) ABSTRACT

This disclosure provides an antenna device that includes an electromagnetic wave radiation source for radiating an electromagnetic wave, and an electromagnetic wave shaping module, arranged forward of the electromagnetic wave radiation source, where a plurality of slot array rows each including a plurality of slots arranged in the horizontal direction are arranged in the vertical direction.

22 Claims, 9 Drawing Sheets

(56) References Cited

U.S. PATENT DOCUMENTS

| | | | | |
|---|---|---|---|---|
| 7,019,682 | B1 * | 3/2006 | Louberg et al. | 342/22 |
| 7,095,384 | B2 * | 8/2006 | Koreyasu et al. | 343/853 |
| 7,119,753 | B2 * | 10/2006 | Hidai et al. | 343/771 |
| 7,170,446 | B1 * | 1/2007 | West et al. | 342/372 |
| 8,098,207 | B1 * | 1/2012 | Herting et al. | 343/776 |
| 8,212,726 | B2 * | 7/2012 | Baliarda et al. | 343/700 MS |
| 8,384,499 | B2 * | 2/2013 | Suzuki et al. | 333/237 |
| 2004/0032374 | A1 * | 2/2004 | Lee et al. | 343/772 |
| 2004/0056814 | A1 * | 3/2004 | Park et al. | 343/771 |
| 2004/0066345 | A1 * | 4/2004 | Schadler | 343/767 |
| 2004/0066346 | A1 * | 4/2004 | Huor | 343/770 |
| 2004/0104859 | A1 * | 6/2004 | Lo | 343/767 |
| 2005/0040993 | A1 * | 2/2005 | Hidai et al. | 343/771 |
| 2005/0162328 | A1 * | 7/2005 | Mori | 343/770 |
| 2005/0219134 | A1 * | 10/2005 | Sergey | 343/770 |
| 2007/0194999 | A1 * | 8/2007 | Morton | 343/767 |
| 2007/0247384 | A1 * | 10/2007 | Fukuchi | 343/767 |
| 2008/0252539 | A1 * | 10/2008 | McGrath | 343/767 |
| 2011/0109497 | A1 * | 5/2011 | Yano | 342/146 |
| 2012/0038530 | A1 * | 2/2012 | Chen et al. | 343/771 |

* cited by examiner

ANTENNA DEVICE AND RADAR APPARATUS

CROSS-REFERENCE TO RELATED APPLICATION(S)

The application claims priority under 35 U.S.C. §119 to Japanese Patent Application No. 2009-251052, which was filed on Oct. 30, 2009, the entire disclosure of which is hereby incorporated by reference.

TECHNICAL FIELD

The present invention relates to an antenna device for transmitting and receiving an electromagnetic wave, and to a radar apparatus using the antenna device.

BACKGROUND

Conventionally, antenna devices for radar narrow down an electromagnetic wave, which is radiated so as to be vertically spread into a beam shape using a metal horn. This configuration is disclosed in JP2005-73212(A), for example.

However, in order to obtain a desired directivity with the metal horn, it is necessary to extend a projecting length of the horn in the radiating direction of the electromagnetic wave, or to expand an aperture angle. As a result, the entire antenna device is increased in size.

SUMMARY

Therefore, the present invention provides an antenna device that is small in the entire size and has a vertical directivity and an radar apparatus using the antenna device.

According to an aspect of the invention, an antenna device includes an electromagnetic wave radiation source for radiating an electromagnetic wave, and an electromagnetic wave shaping module, arranged forward of the electromagnetic wave radiation source, where a plurality of slot array rows each including a plurality of slots arranged in the horizontal direction are arranged in the vertical direction.

The electromagnetic wave may have its center axis substantially in a horizontal plane.

The electromagnetic wave shaping module may include at least a pair of the slot array rows arranged at positions mutually symmetrical in the vertical direction with respect to a horizontal plane including the center axis.

The slot arrays may include the odd number of rows.

The center slot array row located at the vertical center position among the slot arrays may be provided in a plane parallel to the radiating direction of the electromagnetic wave.

Each slot of the slot array located at the vertical center position may have a bow-tie shape.

The plurality of slot array rows may be arranged such that each slot of one slot array row is located at a horizontal center position between corresponding two slots of another slot array or other slot array rows adjacent to the one slot array row in the vertical direction, respectively.

At least the pair of the slot array rows may be provided outside of a horizontal width of the electromagnetic wave radiation source.

A horizontal aperture surface of the electromagnetic wave radiation source may be larger than a perpendicular aperture surface thereof.

The electromagnetic wave radiation source may be a plane dipole antenna arranged in the horizontal direction.

The electromagnetic wave shaping module may include a slot plate formed with the slot array rows and oriented perpendicular to the dipole antenna, and a cover part coupled to an upper part and a lower part of the slot plate and for covering above and below the plane dipole antenna.

The electromagnetic wave shaping module may have a protruding shape in a cross-section and may have a plane perpendicular to the protruding direction on the opposite side from the protruding direction. The slot array rows may extend substantially horizontally in the plane perpendicular to the protruding direction. The plane dipole antenna may be arranged inside the electromagnetic wave shaping module.

The electromagnetic wave radiation source may be a patch antenna arranged in the horizontal direction.

The electromagnetic wave shaping module may include a slot plate formed with the slot array rows and oriented perpendicular to the patch antenna, and a cover part coupled to an upper part and a lower part of the slot plate and for covering above and below of the patch antenna.

The electromagnetic wave shaping module may have a protruding shape in a cross-section and may have a plane perpendicular to the protruding direction on the opposite side from the protruding direction. The slot array rows may extend substantially horizontally in the plane perpendicular to the protruding direction. The patch antenna may be arranged inside the electromagnetic wave shaping module.

The electromagnetic wave radiation source may be a waveguide where its tube axis is oriented in the horizontal direction and a plurality of source slots of the electromagnetic wave radiation are formed toward the front.

A distance between the electromagnetic wave radiation source and the slot may be substantially 0.3 wavelength or more of a wavelength of the electromagnetic wave.

A distance between the electromagnetic wave radiation source and the center slot array row may be substantially 0.3 wavelength of a wavelength of the electromagnetic wave, and a distance between the electromagnetic wave radiation source and the pair of the slot array rows may be substantially 0.8 wavelength of the wavelength of the electromagnetic wave.

According to another aspect of the invention, a radar apparatus includes an antenna device, the antenna device including an electromagnetic wave radiation source for radiating an electromagnetic wave, and an electromagnetic wave shaping module, arranged forward of the electromagnetic wave radiation source, where a plurality of slot array rows each including a plurality of slots arranged in the horizontal direction are arranged in the vertical direction. The radar apparatus further includes a reception circuit for processing an echo signal based on the electromagnetic wave discharged from the antenna device The radar apparatus may further include a driving device for horizontally rotating the antenna device.

According to the aspects of the invention described above, the electromagnetic wave radiated from the electromagnetic wave radiation source spreads in a spherical surface shape, it couples to two or more slots provided in the radiating direction (front), and its directivity is shaped to be formed in a beam shape. Particularly, by providing the two or more slot array rows perpendicularly to each other, the electromagnetic wave outputted from the electromagnetic wave radiation source has a directivity in the vertical direction as well. The beam having the vertical directivity is radiated from the antenna device.

The distance between the electromagnetic wave radiation source and the slot may be defined by a wavelength $\lambda$ of the radiated electromagnetic wave, and the cross-sectional shape of the electromagnetic wave radiation source and the electromagnetic wave shaping module. For example, in order to couple the electromagnetic wave radiation source to the slot strongly, the distance may be at least 0.3 wavelength. Therefore, with the structure of the aspect of the invention, when realizing the directivity equivalent to that of the conventional metal horn, the projecting length in the electromagnetic wave radiating direction may be significantly shorter, compared with the metal horn.

In the above-described aspect of the invention, the slot array may include the pair of slot arrays that are provided in the vertically symmetrical positions with respect to a plane parallel to the radiating direction of the electromagnetic wave. For example, when arranging two rows, two slot array rows are arranged in parallel in the up-and-down direction (vertical) with respect to the electromagnetic wave radiation source. In this case, the final beam shape can be made into a vertically symmetrical shape. Alternatively, in the case of the odd number of rows, the slot array provided at the vertical center may be provided on the plane parallel to the electromagnetic wave radiating direction of the electromagnetic wave radiation source.

As for the electromagnetic wave radiation source, a plane dipole antenna, a patch antenna, a waveguide slot array antenna or the like may be used, which has a wider horizontal aperture surface than a vertical aperture surface.

The aspect of the invention reduces the entire antenna device in size and improves the vertical directivity.

BRIEF DESCRIPTION OF THE DRAWINGS

The present disclosure is illustrated by way of example and not by way of limitation in the figures of the accompanying drawings, in which the like reference numerals indicate like elements and in which:

FIG. 1A is a perspective view which is viewed from a front side, FIG. 1B is an elevational view, FIG. 1C is an A-A cross-sectional view of FIG. 1B, and FIG. 1D is a perspective view which is viewed from a rear side;

DETAILED DESCRIPTION

Figure 1A:
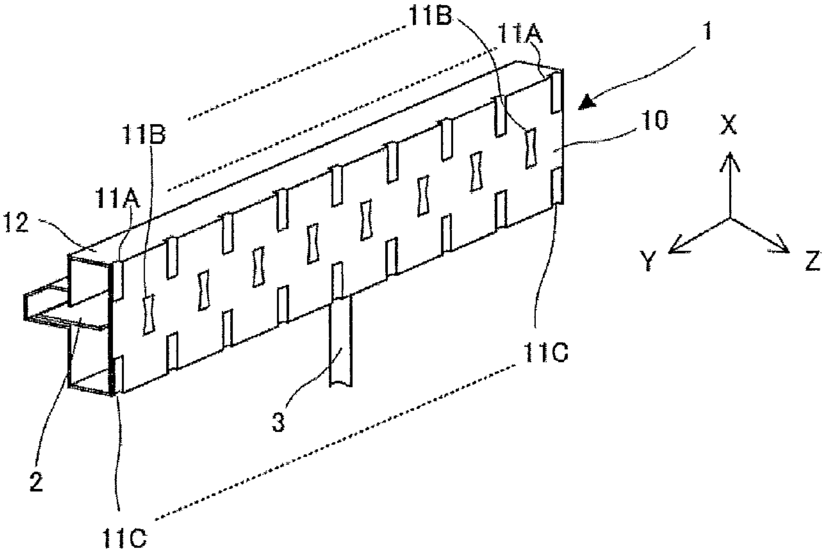
FIGS. 1A to 1D are views showing appearances of an antenna device according to an embodiment of the present invention, where
Figure 1B:
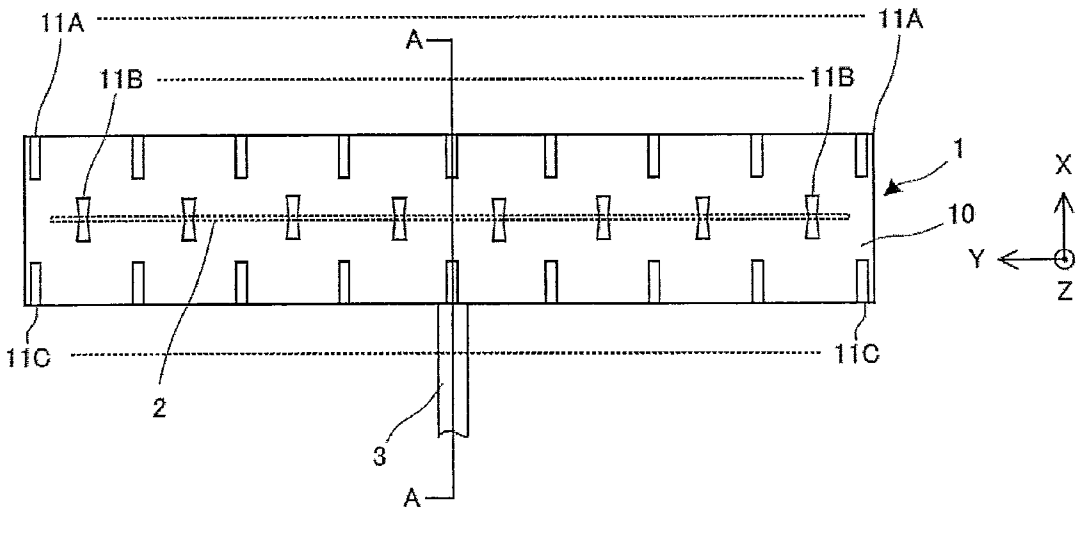

Hereinafter, several embodiments of an antenna device according to the present invention is described with reference to the drawings.

First Embodiment

First, with reference to FIGS. 1A to 1D, 2, 3A and 3B, an embodiment of the antenna device according to the present invention is described. In this embodiment, a vertically upward direction is an X-axis direction, a radiating direction of an electromagnetic wave is a Z-axis direction (front direction), and a direction perpendicular to the X-axis, which is a rightward direction to the electromagnetic wave radiating direction is a Y-axis direction.

As shown in FIGS. 1A to 1D, the antenna device of this embodiment includes an electromagnetic wave shaping module 1, an antenna substrate 2, and a power feed pipe 3. The antenna substrate 2 is a radiation source of the electromagnetic wave, and as shown in FIG. 2, it is exemplarily shown as a plane dipole antenna in this embodiment. The plane dipole antenna is typically formed by printing thin wiring 22 made of a conducting material, such as copper, on a surface of a dielectric substrate 20 of a flat plate shape elongated in a horizontal direction (Y-axis direction in this embodiment). The antenna substrate 2 is laid horizontally on a rear lower plate 16 of the electromagnetic wave shaping module 1, and is fastened by screws with the rear lower plate 16. The antenna substrate 2 is connected with the power feed pipe 3 at a center position of the electromagnetic wave shaping module 1 in the Y-axis direction.

The power feed pipe 3 is an electric power feed module of a pipe shape extending in the vertical direction (X-axis direction). The power feed pipe 3 supplies electric power to the antenna substrate 2, while supporting the entire antenna device. A through-hole, through which the power feed pipe 3 penetrates, is formed in the rear lower plate 16 of the electromagnetic wave shaping module 1. The power feed pipe 3 is inserted in the through-hole, and electrically connected with the antenna substrate 2. In this embodiment, the electromagnetic wave shaping module 1, the antenna substrate 2, and the power feed pipe 3 are formed in a single integrated structure as the antenna device.

As shown in FIG. 2, eight dipole antennas 21 are formed on a surface of the antenna substrate 2. Each dipole antenna 21 is made of a thin conducting material, such as copper, and is provided with a pair of radiating elements 21*a* and 21*b* which are symmetrically arranged with respect to a straight line parallel to the Z-axis direction. The radiating element 21*a* is arranged at an upper surface side of the antenna substrate 2, and the radiating element 21*b* is arranged at a lower surface side. The number of the dipole antennas 21 is not limited to eight and may be any other number The radiating elements 21*a* and 21*b* are each formed in a rectangular shape elongated in the Y-axis direction. A (positive) Y-axis direction end of the radiating element 21*a* and a negative Y-axis direction end of the radiating element 21*b* are oriented away from each other, while sandwiching the dielectric substrate 20 therebetween. Lengths in the Y-axis direction of the radiating elements 21*a* and 21*b* are set to ¼ of a wavelength $\lambda g$ in the substrate. A pitch between the dipole antennas 21 is set equal to the wavelength $\lambda g$ so that phases of the electromagnetic waves radiated from the antennas in the front direction match with each other.

The wiring 22 is formed on the rear side of the dipole antenna 21. The wiring 22 includes a power feed line 23 formed at the upper surface side of the dielectric substrate 20, and a ground 24 formed on the lower surface side of the dielectric substrate 20, thereby constituting a microstrip line.

Figure 2:
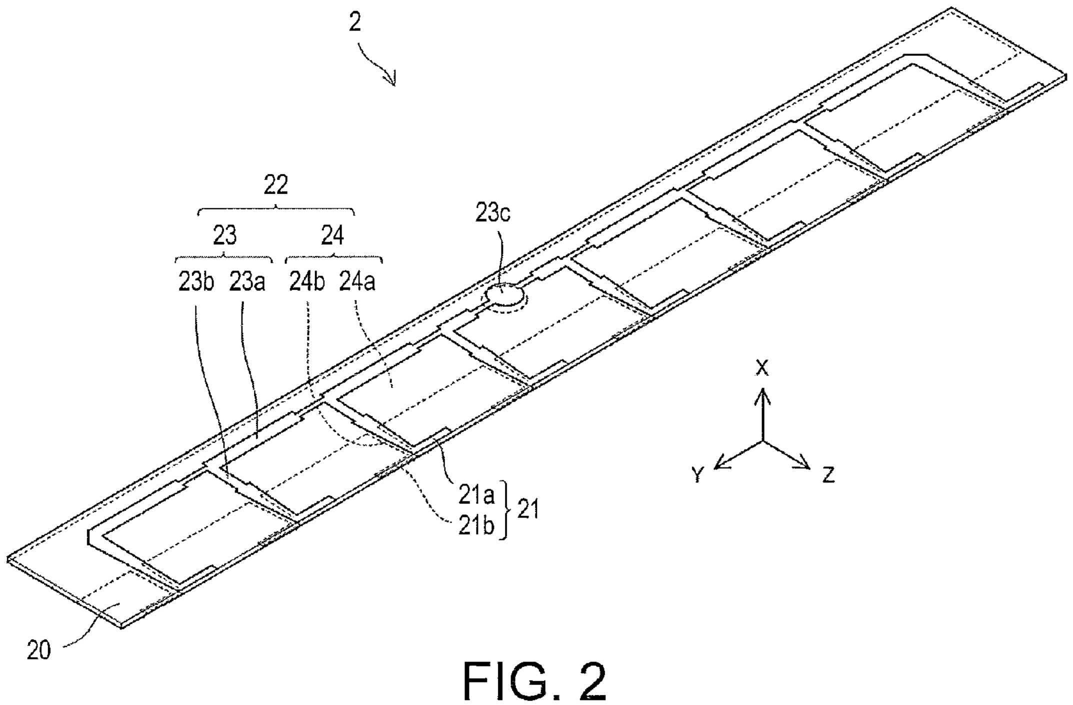
FIG. 2 is a perspective view of a plane dipole antenna applied to this embodiment.
Figure 3A:
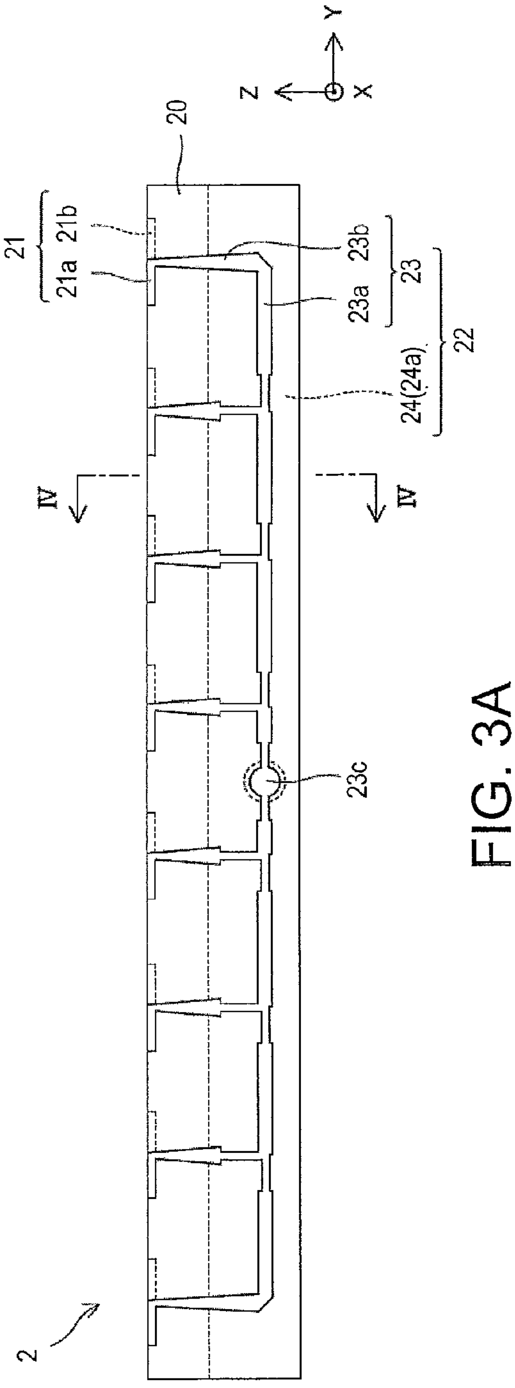
FIG. 3A is a top view of the plane dipole antenna.
Figure 3B:
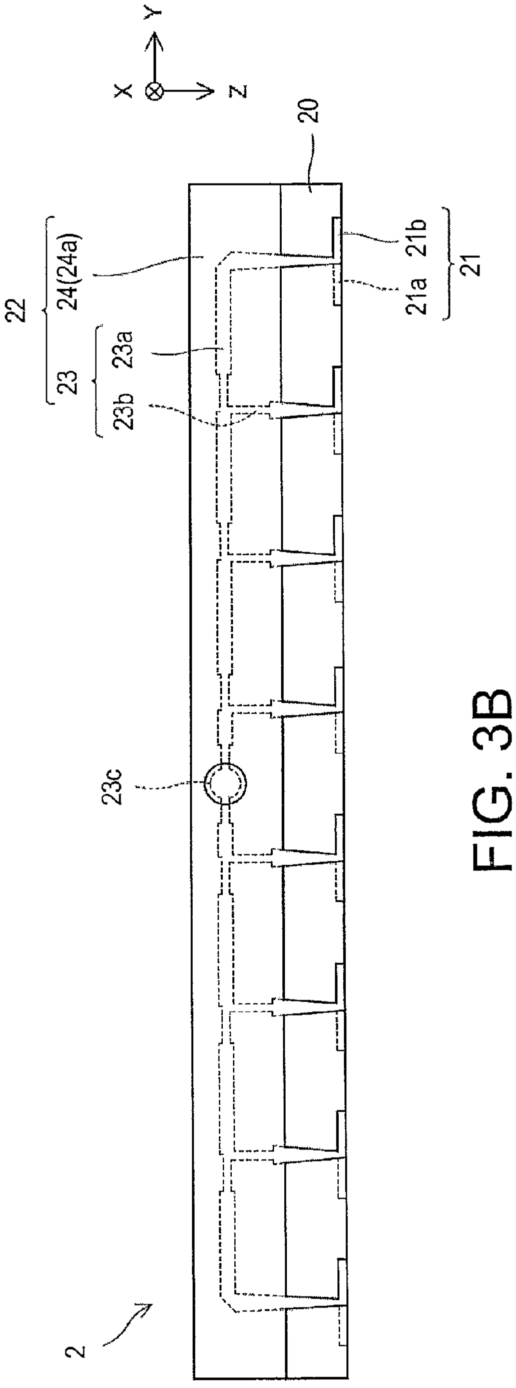
FIG. 3B is a bottom view of the plane dipole antenna.

The power feed line 23 includes a trunk line 23*a* extending in the Y-axis direction, and eight branch lines 23*b* branched from the trunk line 23*a*. The trunk line 23*a* is formed in a rear side area of the upper surface of the dielectric substrate 20. The eight branch lines 23*b* are arranged at an equal interval along the Y-axis direction. Each tip end of the branch line 23*b* is connected with a Y-axis direction end of the radiating element 21*a*, respectively. A power feed part 23*c* is formed at the center in the Y-axis direction of the trunk line 23*a*, and the power feed pipe 3 is electrically connected with the power feed part 23*c*. As shown in FIGS. 2, 3A and 3B, the trunk line 23*a* and the branch lines 23*b* typically vary in widths rather than being constant to adjust the power supply to the dipole antennas 21.

The ground 24 includes a grand main part 24*a* and eight connection lines 24*b*. The grand main part 24*a* is formed substantially in a half area at the rear side of the lower surface of the dielectric substrate 20. The tip ends of the grand main part 24*a* are electrically connected with the negative Y-side end part of the radiating element 21*b*.

With the above-described structure, the electric power of the electromagnetic wave radiated from each dipole antenna 21 will be the maximum in the Z-axis direction and will be zero in the Y-axis direction. Due to reflecting plates (mainly an upper reflecting plate 13 and a lower reflecting plate 17) or the like described later, because the electromagnetic wave radiated to the rear side is also directed in the front direction by the same phase, the electric power of the electromagnetic wave radiated from each dipole antenna 21 will be concentrated in the front direction.

Next, further referring to FIGS. 1A to 1D, the detailed configuration of the electromagnetic wave shaping module 1 is described.

The electromagnetic wave shaping module 1 has a convex cross-sectional shape in the X-Z planes (in this embodiment, convex in the rear direction), and cylindrically covers the antenna substrate 2. The electromagnetic wave shaping module 1 includes a front plate 10, a front upper plate 12, the upper reflecting plate 13, a rear upper plate 14, a rear plate 15, the rear lower plate 16, the lower reflecting plate 17, and a front lower plate 18, which are thin rectangular metal plates (made of copper, aluminum, etc.). The entire antenna substrate 2 except for both the horizontal ends (in the Y-axis direction) is covered with the plurality of metal plates 10-18 described above. In this embodiment, these metal plates are integrated in a single construction as the electromagnetic wave shaping module 1 by welding, bending, etc. In this embodiment, although an example in which both the horizontal ends of the electromagnetic wave shaping module 1 open is shown, the openings may also be closed by metal plates or the like.

Figure 1C:
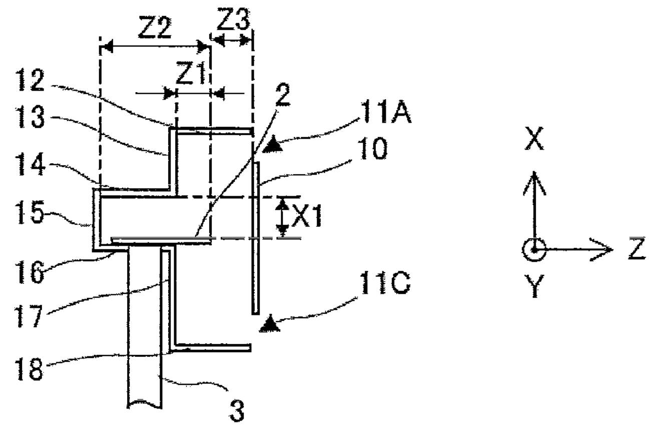

As shown in the cross-sectional view of FIG. 1C, the electromagnetic wave shaping module 1 has a substantially vertically symmetrical shape with respect to the antenna substrate 2. The front upper plate 12 and the front lower plate 18 arranged in Y-Z planes parallel to the antenna substrate 2 function as shields for preventing the electromagnetic wave from leaking out of the electromagnetic wave shaping module 1.

The upper reflecting plate 13 and the lower reflecting plate 17 arranged in X-Y planes perpendicular to the antenna substrate 2 function as reflecting plates for reflecting the electromagnetic wave forward, which is originally radiated rearward from the antenna substrate 2. A distance Z1 between the tip end in the front direction of the antenna substrate 2 and these reflecting plates is set such that phases of the electromagnetic wave reflected on the reflecting plates and directed forward is in agreement with the phase of the electromagnetic wave radiated from the antenna substrate 2 directly in the front direction.

The rear upper plate 14 and the rear lower plate 16 arranged in Y-Z planes parallel to the antenna substrate 2 are arranged so as to sandwich the antenna substrate 2, and a certain amount of gap is formed therebetween. In this embodiment, a gap of a distance X1 is formed between the antenna substrate 2 and the rear upper plate 14. The distance X1 is set according to a wavelength λ of the electromagnetic wave radiated by the antenna substrate 2. For example, if the distance X1 is too large, the electromagnetic wave reflected on the upper reflecting plate 13 will be less than the electromagnetic wave reflected on the lower reflecting plate 17 and, thus, the vertical symmetry of the electromagnetic wave radiated in the front direction will be lost. Particularly, if the distance X1 becomes larger than ½ of the wavelength λ, the electromagnetic wave reflected on the upper reflecting plate 13 will be decreased significantly. Therefore, the distance X1 is desirable to be at most below the ½ wavelength. On the other hand, if the distance X1 is made shorter (for example, ⅓ or less of the wavelength λ), the electromagnetic wave will be difficult to enter into the gap of distance X1. Therefore, it is more desirable to be ⅓ or less of the wavelength λ.

If the distance X1 is set to ½ to ⅓ of the wavelength λ, the electromagnetic wave entered into the gap of distance X1 reflects also on the rear plate 15. Therefore, a distance Z2 between the front tip end of the antenna substrate 2 and the rear plate 15 is set according to the wavelength λ. Specifically, the distance Z2 is adjusted so that the phase of the electromagnetic wave reflected on the rear plate 15 is in agreement with the phase of the electromagnetic wave radiated in the front direction from the antenna substrate 2.

However, if the distance X1 is too small, because the electromagnetic field generated between the antenna substrate 2 and the rear upper plate 14 becomes strong, it is desirable to secure the distance X1 to the extent in which the power supply to the dipole antenna of the antenna substrate 2 is possible (for example, ⅒ of the wavelength λ). That is, the distance X1 is desirable to be ⅒ or more and ⅓ or less of the wavelength λ.

Figure 1D:
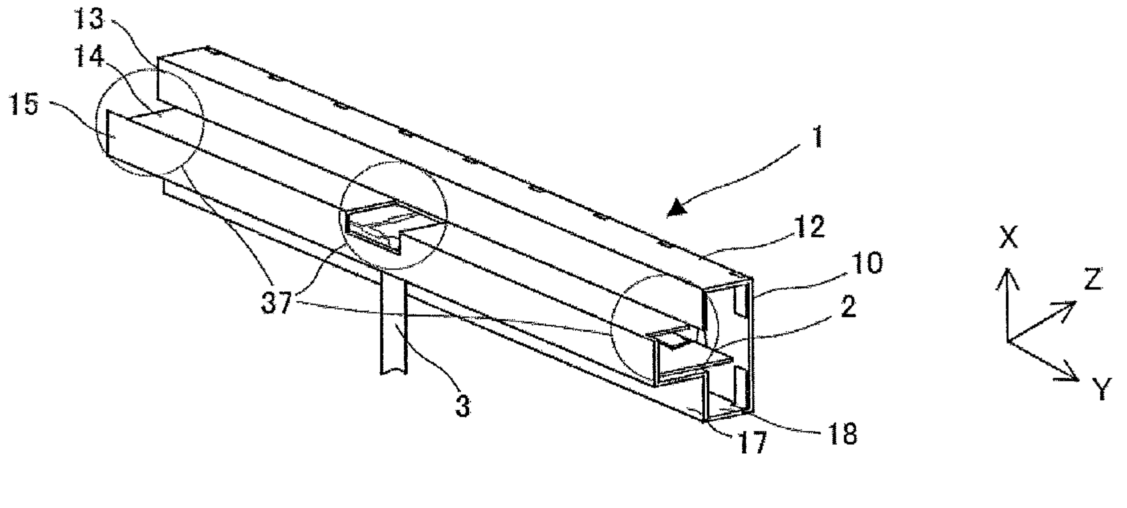

As shown in FIG. 1D, notched portions 37 through which one to perform screw fastening to fix the antenna substrate 2 to the rear lower plate 16 is formed near the center position in the horizontal direction of the rear upper plate 14 and the rear plate 15, and at both horizontal ends of the rear upper plate 14. If the horizontal lengths of the notched portions 37 are made short (equal to or less than the arrayed pitch of the dipole antenna 21), the electromagnetic wave hardly leaks from the notched portions 37.

Figure 4A:
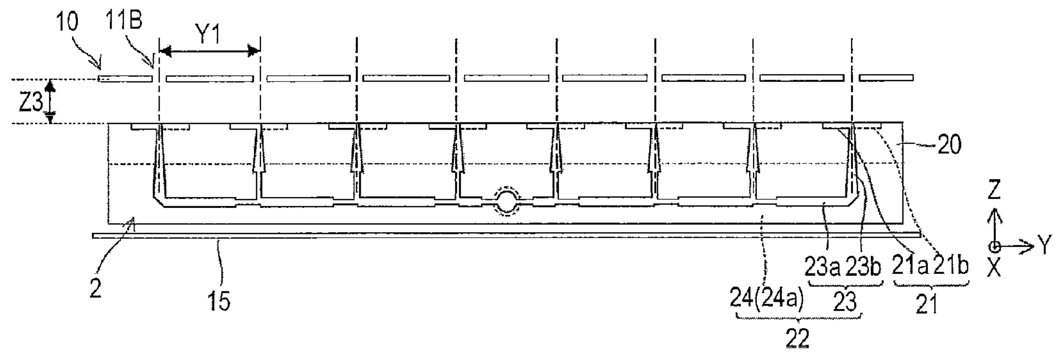
FIGS. 4A and 4B are views showing a spatial relationship between the plane dipole antenna and each slot in the antenna device of this embodiment.
Figure 4B:
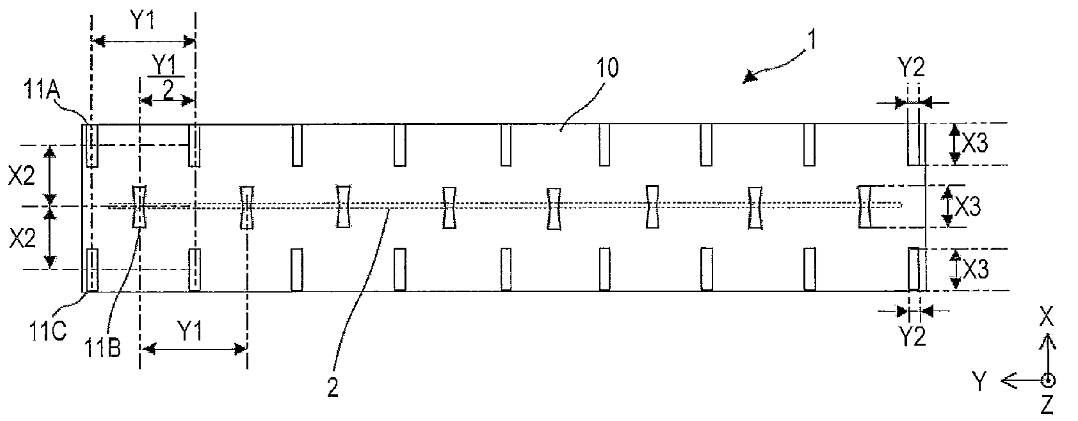

Next, a structure and a function of the front plate 10 used as a substantial function part of the electromagnetic wave shaping module 1 are described. FIGS. 4A and 4B are views showing a spatial relationship between the plane dipole antenna and each slot in the antenna device of this embodiment. As shown in FIG. 4B, three rows of the slot arrays are arranged vertically to each other in the front plate 10. The slot array arranged in the middle row includes eight slots 11B arranged in the horizontal direction. The slot array arranged in the top row includes nine slots 11A arranged in the horizontal direction. The slot array arranged in the bottom row includes nine slots 11C arranged in the horizontal direction.

The electromagnetic wave radiated from the dipole antenna 21 couples with each slot, and produces a new wave source. A phase distribution of the electromagnetic wave produced by coupling at each slot is defined by a distance between a position of each slot and a position of the dipole antenna 21. An aperture distribution (amplitude) is defined by the horizontal length and the vertical length of each slot. For example, in this embodiment, the slots 11A and 11C are made to have the same width (horizontal length Y2) and the same height (vertical length X3) and the slot 11B is made to be slightly larger than the slots 11A and 11C so that all the aperture distribution of the slots is equal to each other. The slot 11B couples strongly because it is close to the dipole antenna, and the slots 11A and 11C couple weaker because they are far from the dipole antenna. The above-described configuration functions to correct the coupling difference of both.

The height of the slot is set to about ½ of the wavelength λ of the electromagnetic wave to obtain the maximum output at the vertical center position and, thus, the maximum output can be obtained in all the slots.

In this embodiment, the slot 11A in the top row and the slot 11C in the bottom row have a rectangular shape, and on the other hand, the slot 11B in the middle row has a bow-tie shape. Because the slot is made in the bow-tie shape, an operating frequency band can be extended. If the slot is made in the bow-tie shape, because a strong electric field occurs at the vertical center position of the slot (a part where the slot width is the smallest), an effect of suppressing a vertical polarization can also be acquired.

The slots 11B in the middle row are arranged exactly in the front of (i.e., opposing to) the eight dipole antennas 21, respectively, and as shown in FIG. 4A, an arrayed pitch Y1 of the slots 11B is the same as the arrayed pitch of the dipole antenna 21. A distance Z3 between the slots 11B and the corresponding dipole antennas 21 is defined by the wavelength λ of the electromagnetic wave. Specifically, in order to obtain a strong coupling of the electromagnetic wave radiated from the dipole antenna 21 at the position of the slot 11B, the distance Z3 may be an odd times (¼, ¾, etc.) of ¼ of the wavelength λ.

However, the electromagnetic wave coupled to the slot contains what reflected on the upper reflecting plate and the like in addition to the electromagnetic wave radiated from the dipole antenna 21. That is, a wavelength of the coupled electromagnetic wave is different from the wavelength λ according to the cross-sectional shape of the electromagnetic wave shaping module 1 (refer to FIG. 1C). Therefore, in this embodiment, the distance Z3 between the dipole antenna 21 and the slot 11B is set to about 0.3 times of the wavelength λ as a value in consideration of these influences.

As shown in FIG. 4B, each slot 11A in the top row is arranged at the horizontal center position of the corresponding two slots 11B in the middle row. Similarly, each slot 11C in the bottom row is arranged at the horizontal center position of the corresponding two slots 11B in the middle row. That is, the horizontal position of each slot is arranged at the horizontal center position between the corresponding two slots in other slot array rows adjacent vertically thereto. The arrayed pitch of the slots 11A in the top row and the arrayed pitch of the slots 11C in the bottom row are the same as the arrayed pitch of the dipole antennas 21, as described above.

Here, if the slot arrays are configured in three rows as described above, respective slots in the top and bottom rows are arranged at the horizontal center position between the corresponding two slots in the middle row. If the phases of all the slots are made in agreement with each other, and assuming that a distance between the slots in the middle row nearest to the electromagnetic wave radiation source and the electromagnetic wave radiation source is 0.3 wavelength, the slots in the top and bottom rows have at least a distance from the electromagnetic wave radiation source of 0.8 wavelength. The respective slots in the top and bottom rows are arranged at the center position of the corresponding two slots in the middle row. With such a configuration, the distances between the respective slots and the electromagnetic wave radiation source can be gained, while the distance between the slot array rows can be shortened, thereby the device can be reduced in vertical size.

In this embodiment, in order to make the phases of all the slots in agreement with each other as described above, when the distance between the slot 11B and the dipole antenna 21 is made to be 0.3 wavelength, the distance between the slot 11A (and the slot 11C) and the dipole antenna 21 is made to be 0.8 wavelength. Usually, when a difference of the distance between the slot 11B and the dipole antenna 21, and the distance between the slot 11A (and the slot 11C) and the dipole antenna 21 is made to be an integral multiple of the wavelength λ, the phases are in agreement with each other.

However, as described above, because the electromagnetic wave coupled to the slot contains what is reflected on the upper reflecting plate and the like, it will have a wavelength different from the wavelength λ according to the cross-sectional shape of the electromagnetic wave shaping module 1. For this reason, the distance between the slot 11A (and the slot 11C) and the dipole antenna 21 is made to be about 0.8 wavelength as a value in consideration of these influences.

By arranging the respective slots 11A and 11C in the top and bottom rows at the center position of the corresponding two slots 11B in the middle row, the distance with the dipole antenna 21 can be gained, and the distance X2 between the slot array rows can be shortened. By shortening the distance between the slot array rows, the vertical size of the entire antenna device can be reduced.

At least one of the slot arrays may be provided with a slot or slots at an area that is located outside of the horizontal width of the electromagnetic wave radiation source. In this case, the horizontal width of the wave source of the electromagnetic wave shaping module becomes wider than the width of the electromagnetic wave radiation source, thereby its horizontal directivity improves (a beam width will be narrowed if it has the same side lobe level).

Specifically, in this embodiment, the slot arrays in the top and bottom rows are provided with the horizontal end slots located outside of the width of the antenna substrate 2. The number of slots is more than the number of the dipole antennas 21. Thereby, the electromagnetic wave radiated after being coupled to the slot arrays in the top and bottom rows is radiated by a width wider than the width of the antenna substrate 2 which is the original electromagnetic wave radiation source. By radiating the electromagnetic wave by a greater width, the horizontal directivity improves. If it has the same side lobe level, the beam width will be narrowed more.

Next, the vertical directivity of the antenna device according to this embodiment of the present invention is described comparing with the conventional antenna device.

Figure 5A:
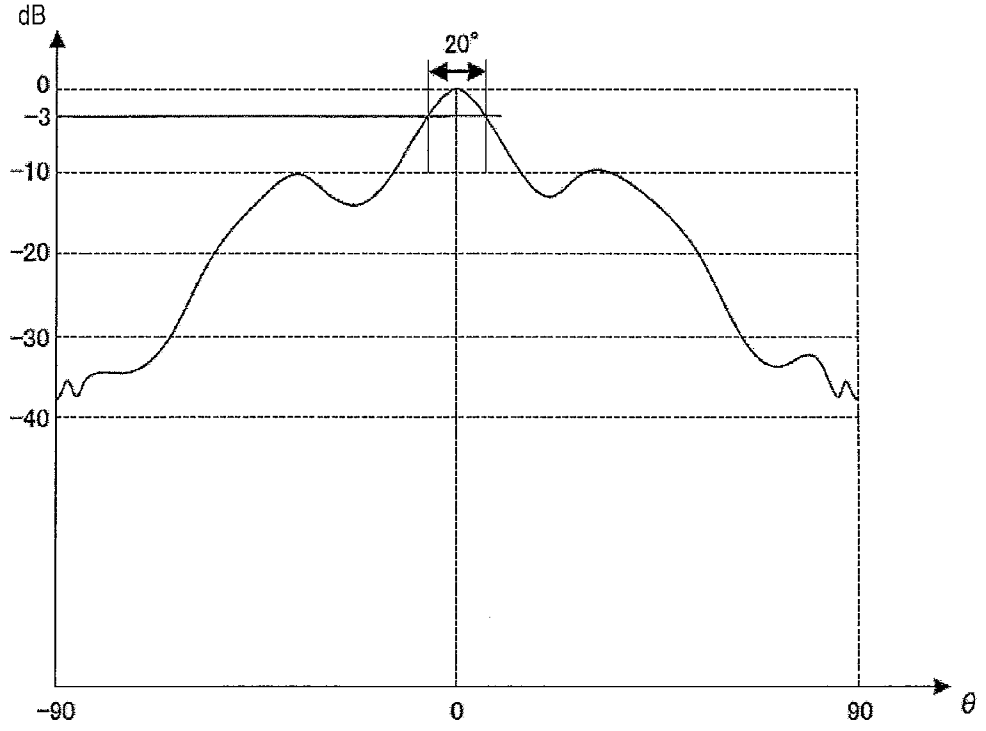
FIG. 5A (Related Art)
FIG. 5A is a graph showing a vertical directivity in a metal horn of a conventional antenna device.
Figure 5B:
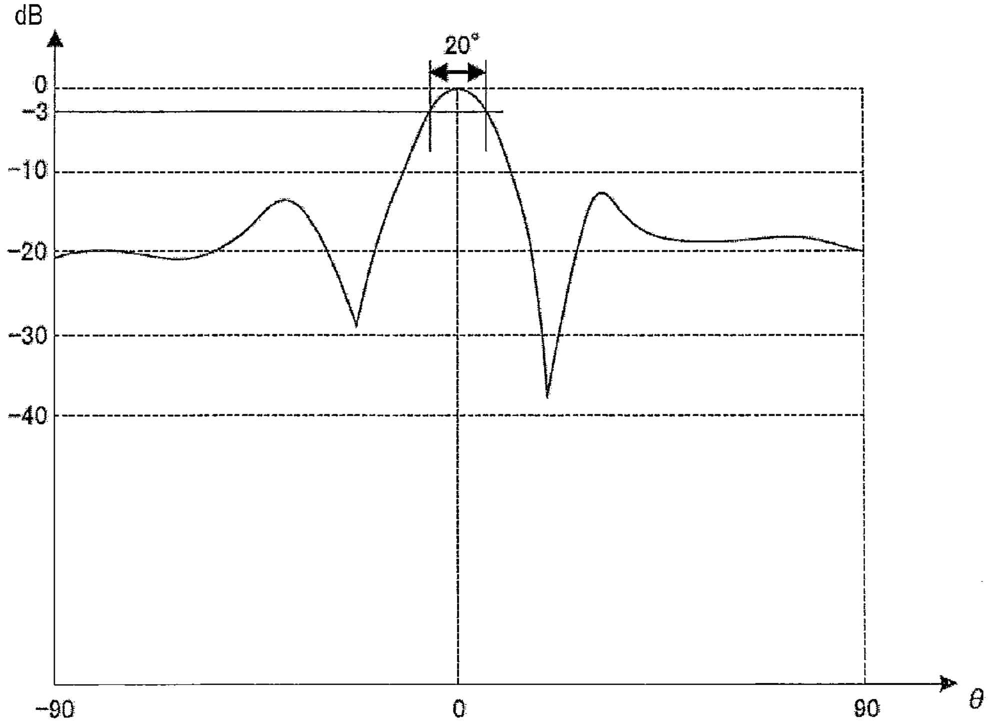
FIG. 5B is a graph showing a vertical directivity of the antenna device of this embodiment.

FIG. 5A is a graph showing the vertical directivity of the antenna device provided with the conventional metal horn, and FIG. 5B is a graph showing the vertical directivity of the antenna device provided with the electromagnetic wave shaping module 1 of this embodiment. In these graphs, the vertical axes represent an intensity (dB) and the horizontal axes represent a vertical angle where a direction of the plane in which the antenna substrate 2 is installed is set to 0 degrees.

As shown in FIGS. 5A and 5B, although beam widths of main lobes are substantially the same level (about 20° at −3 dB width) in the conventional metal horn and the electromagnetic wave shaping module 1 of this embodiment, a side lobe level of this embodiment is reduced by about several decibels, thereby the vertical directivity of this embodiment is equivalent or better than the conventional metal horn. In the metal horn of the conventional antenna device, because the perpendicular phases are not in agreement with each other, the intensity gently falls from 0 degrees toward both sides. On the other hand, in the electromagnetic wave shaping module 1 of this embodiment, because all the phases of each slot array is equal, thereby the intensity steeply falls from 0 degrees toward both sides. Therefore, the side lobe level falls.

Further, in the aspect of this embodiment where the directivity equivalent or better than the conventional metal horn is realized as described above, a height of the electromagnetic wave shaping module 1 (length in the X-axis direction) is about ¾ compared with the metal horn. In particular, a projecting length in the electromagnetic wave radiating direction (length in the Z-axis direction) is about ½ compared with the metal horn. This shortening of the projecting length realizes the reduction of the entire antenna device in size.

Naturally, the size of the entire radar apparatus including a radome (also including a reception circuit for processing an echo signal based on the electromagnetic wave discharged from the antenna device) becomes dramatically smaller than the case where the conventional metal horn is used. In addition, because the entire antenna device is reduced in size, a load of a driving device for rotating the antenna device horizontally also becomes very small.

In this embodiment, because the pitches of the respective slot arrays are made the same as the pitch of the dipole antenna 21 and the phases of all the slots are in agreement with the phase of the dipole antenna 21, the horizontal directivity follows the directivity of the antenna substrate 2. However, as described above, for the slot arrays in the top and bottom rows, because the electromagnetic wave can be radiated by a width greater than the width of the antenna substrate 2, the horizontal directivity is also improved comparing with the conventional antenna device.

As described above, although the antenna device of this embodiment has a single source of the electromagnetic wave radiation, new wave sources are produced in each of two or more slot array rows provided vertically to each other (where the electromagnetic wave is shaped). Thereby, the electromagnetic wave finally radiated has the vertical directivity as well and, thus, it can be made as a beam.

It may be possible to give arbitrary characteristics to the aperture distribution by adjusting the width and the height of each slot. In addition, it may be possible to give the arbitrary characteristics to the phase distribution by adjusting the positions of the slots. The antenna device of this embodiment can freely control the beam shape by this function. In particular, in this embodiment, the beam can be narrowed down in the vertical direction by making the aperture distribution and the phase distribution equal throughout the slots. Adoption of this configuration enables it to reduce the antenna device in size.

Second Embodiment

Figure 6:
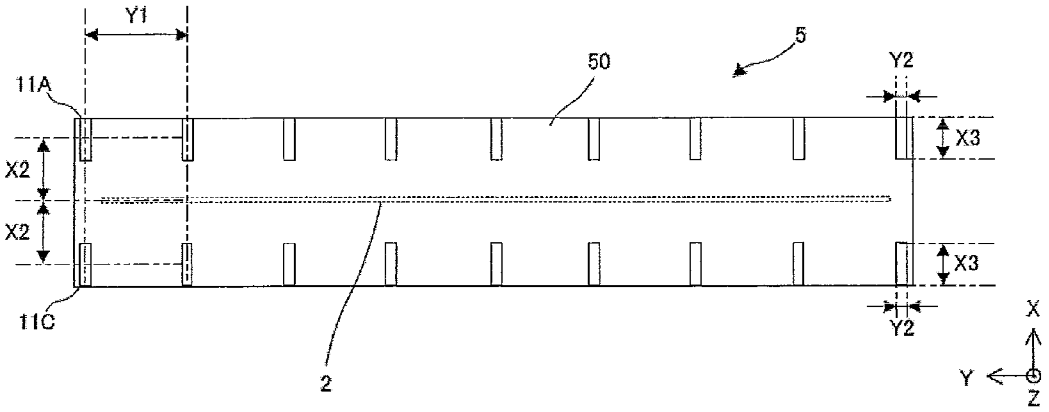
FIG. 6 is an elevational view of another embodiment of the antenna device according to the present invention.

The number of rows of the slot arrays is not limited to three rows as described in the previous embodiment. For example, as shown in FIG. 6, like an electromagnetic wave shaping module 5 (front plate 50), the slot array 11B in the middle row may be omitted to have two slot array rows. That is, the two slot arrays may be arranged symmetrically in the vertical direction with respect to the antenna substrate 2 to form a beam shape symmetrical in the vertical direction. When having the odd number of rows like the previous embodiment, a middle slot array provided at the vertical center position is arranged in front of the antenna substrate 2. Alternatively, when having the even number of rows like this embodiment, the slot array to be provided at the vertical center position of the odd number of rows can be omitted.

Third Embodiment

Figure 7A:
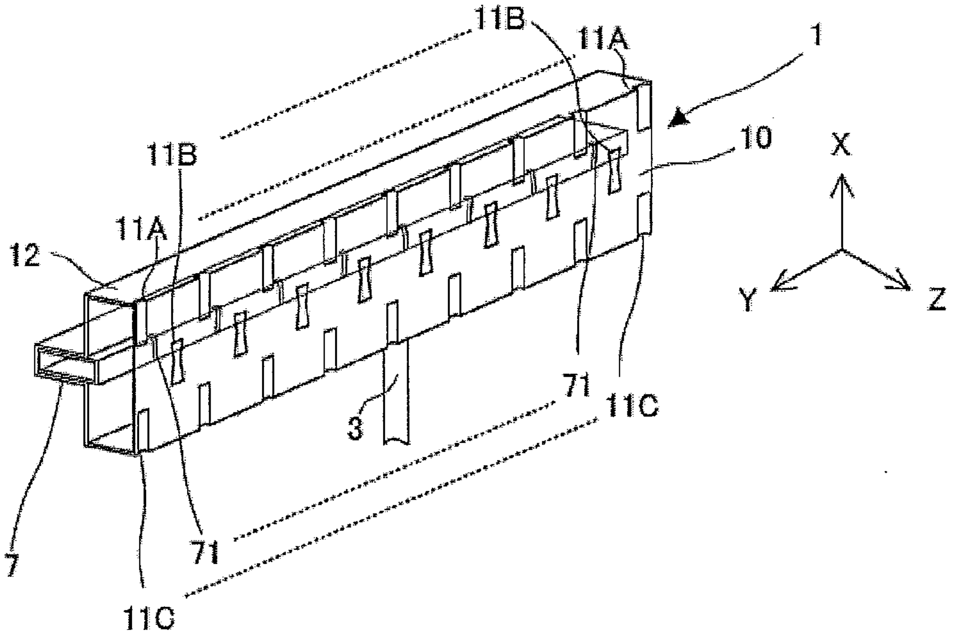
FIG. 7 is a perspective view of another embodiment of the antenna device according to the present invention.

Although the plane dipole antenna is shown as the electromagnetic wave radiation source in the previous embodiments, any of other sources of the electromagnetic wave radiation, such as a patch antenna, a waveguide slot array antenna, which is arrayed, may be used. For example, when using the waveguide slot array antenna as the electromagnetic wave radiation source, as shown in FIG. 7A, a tube axis of a waveguide 7 may be oriented in the horizontal direction, and two or more source slots 71 of the electromagnetic wave radiation provided in a narrower surface side (or a wider surface side) may be formed toward the front. In this configuration, each slot 11B in the middle row is arranged in front of each source slot 71 of the electromagnetic wave radiation of the waveguide 7.

Figure 7B:
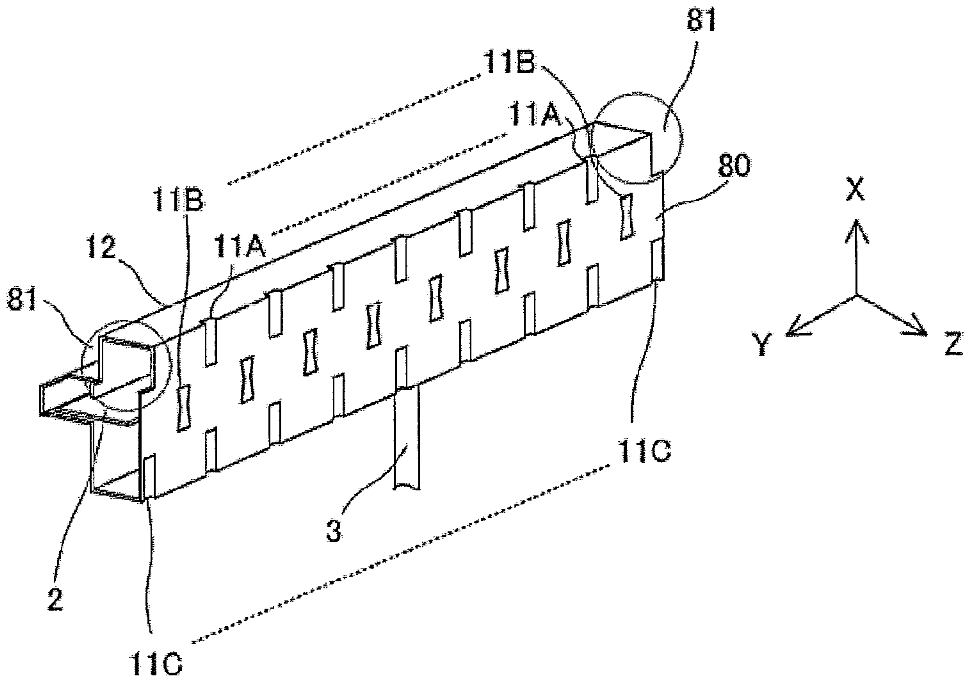

In this embodiment, the electromagnetic wave shaping module 1 has a substantially symmetrical shape in the vertical direction with respect to the antenna substrate. That is, the slot arrays are provided symmetrically in the vertical direction. The slot arrays may be provided at symmetrical positions in the vertical direction with respect to a plane parallel to the electromagnetic wave radiating direction of the electromagnetic wave radiation source, and the slots may be or may not be symmetrical in their number between the arrays (i.e., may be or may not be the same number). For example, like a front plate 80 shown in FIG. 7B, the right and left ends of the slot array in the top row may be omitted to make it as notched portions 81.

Figure 8:
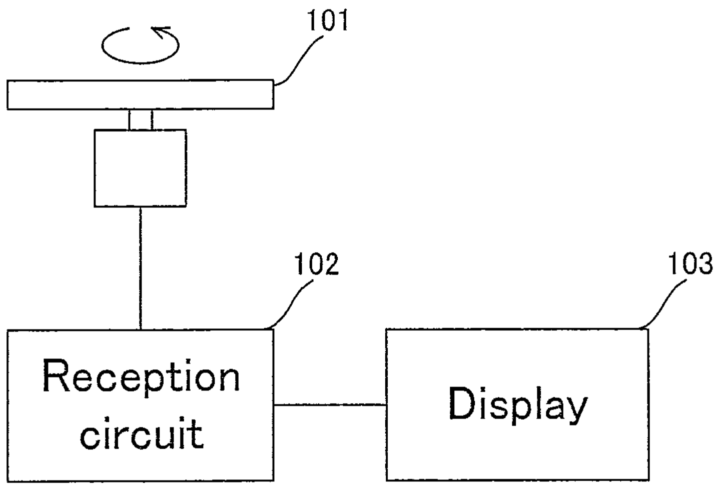
FIG. 8 is a block-diagram of radar apparatus according to the present invention.

An antenna device of the present invention can be applied to a radar apparatus. FIG. 8 describes the configuration of the radar apparatus utilized an antenna device of the present invention. The radar apparatus has the antenna device 101 and a reception circuit 102 to process an echo signal based on an electromagnetic wave discharged from the antenna device and a display rendering the echo signal.

The antenna device has an electromagnetic wave radiation source, and an electromagnetic wave shaping module arranged forward of the electromagnetic wave radiation source. The electromagnetic wave shaping module has a plurality of slot array rows each including a plurality of slots arranged in the horizontal direction are arranged in the vertical direction, as described in any of the first through the forth embodiment.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. An antenna device, comprising:

a plane dipole antenna for radiating an electromagnetic wave, the plane dipole antenna being arranged in a first direction and configured such that the radiated electromagnetic wave has its center axis substantially in a plane extending in the first direction;

an electromagnetic wave shaping module, arranged forward of the electromagnetic wave radiation source, the electromagnetic wave shaping module extending in the first direction; and a plurality of slot array rows, each slot array row including a plurality of slots arranged in the first direction, and the slot array rows being arranged in a second direction, the second direction being perpendicular to the first direction;

the electromagnetic wave shaping module including at least a pair of the slot array rows arranged at positions mutually symmetrical in the second direction with respect to a plane extending in the first direction, said plane including the center axis;

where each slot in a topmost slot array row, and each slot in a bottom-most slot array row, is configured to extract a radiated electromagnetic wave from the electromagnetic wave radiation source.

2. The antenna device of claim 1, wherein the slot arrays include an odd number of rows.

3. The antenna device of claim 2, wherein a center slot array row located at a center position in the second direction among the slot arrays is provided in a plane parallel to the radiating direction of the electromagnetic wave.

4. The antenna device of claim 3, wherein a distance between the electromagnetic wave radiation source and the center slot array row is substantially 0.3 wavelength of a wavelength of the electromagnetic wave, and a distance between the electromagnetic wave radiation source and the pair of the slot array rows is substantially 0.8 wavelength of the wavelength of the electromagnetic wave.

5. The antenna device of claim 2, wherein each slot of the slot array located at a center position in the second direction has a bow-tie shape.

6. The antenna device of claim 1, wherein the electromagnetic wave shaping module includes:

a slot plate formed with the slot array rows and oriented perpendicular to the dipole antenna; and a cover part coupled to an upper part and a lower part of the slot plate and for covering above and below the plane dipole antenna.

7. The antenna device of claim 1, wherein the electromagnetic wave shaping module has a protruding shape in a cross-section and has a plane perpendicular to the protruding direction on the opposite side from the protruding direction, and the slot array rows extend substantially in the first direction in the plane perpendicular to the protruding direction; and wherein the plane dipole antenna is arranged inside the electromagnetic wave shaping module.

8. The antenna device of claim 1, where the electromagnetic wave shaping module includes:

a front plate extending in the first direction and facing in a direction of electromagnetic wave radiation;

an upper front plate extending in the first direction, arranged at a right angle to the front plate, and facing perpendicular to the front plate; and a lower front plate extending in the first direction, arranged at a right angle to the front plate, and facing in a direction directly opposite to the upper front plate;

the front plate having p said plurality of slot array rows disposed thereon, each slot having a length and a width, the length being greater than the width and the length extending in the second direction;

where a first slot array row from among said plurality is disposed along an edge of said front plate such that each slot included in the first slot array row extends lengthwise past the edge of the front plate and onto the upper front plate.

9. The antenna device of claim 1, where the first direction is a horizontal direction and the second direction is a vertical direction.

10. The antenna device of claim 1, where each slot in a topmost slot array row, and each slot in a bottom-most array row is configured to extract a radiated electromagnetic wave from the electromagnetic wave radiation source such that the extracted radiated electromagnetic wave has directivity in the first direction and is radiated in a third direction that is perpendicular to the first and second directions.

11. An antenna device, comprising:

a patch antenna for radiating an electromagnetic wave, the patch antenna being arranged in a first direction and configured such that the radiated electromagnetic wave has its center axis substantially in a plane extending in the first direction;

an electromagnetic wave shaping module, arranged forward of the electromagnetic wave radiation source, the electromagnetic wave shaping module extending in the first direction; and a plurality of slot array rows, each slot array row including a plurality of slots arranged in the first direction, and the slot array rows being arranged in a second direction, the second direction being perpendicular to the first direction;

the electromagnetic wave shaping module including at least a pair of the slot array rows arranged at positions mutually symmetrical in the second direction with respect to a plane extending in the first direction, said plane including the center axis;

where each slot in a topmost slot array row, and each slot in a bottom-most slot array row, is configured to extract a radiated electromagnetic wave from the electromagnetic wave radiation source.

12. The antenna device of claim 11, the plurality of slot array rows are arranged such that each slot of one slot array row is located at a center position in the first direction between corresponding two slots of another slot array or other slot array rows adjacent to the one slot array row in the second direction, respectively.

13. The antenna device of claim 11, wherein at least the pair of the slot array rows are provided outside of a width of the electromagnetic wave radiation source in the first direction.

14. The antenna device of claim 11, wherein an aperture surface of the electromagnetic wave radiation source in the first direction is larger than a perpendicular aperture surface thereof.

15. The antenna device of claim 11, wherein the electromagnetic wave shaping module includes:

a slot plate formed with the slot array rows and oriented perpendicular to the patch antenna; and a cover part coupled to an upper part and a lower part of the slot plate and for covering above and below of the patch antenna.

16. The antenna device of claim 11, wherein the electromagnetic wave shaping module has a protruding shape in a cross-section and has a plane perpendicular to the protruding direction on the opposite side from the protruding direction, and the slot array rows extend substantially in the first direction in the plane perpendicular to the protruding direction; and wherein the patch antenna is arranged inside the electromagnetic wave shaping module.

17. The antenna device of claim 11, wherein the electromagnetic wave radiation source is a waveguide where its tube axis is oriented in the first direction and a plurality of source slots of the electromagnetic wave radiation are formed toward the front.

18. The antenna device of claim 11, wherein a distance between the electromagnetic wave radiation source and the slot is substantially 0.3 wavelength or more of a wavelength of the electromagnetic wave.

19. The antenna device of claim 11, where each slot in a topmost slot array row, and each slot in a bottom-most array row is configured to extract a radiated electromagnetic wave from the electromagnetic wave radiation source such that the extracted radiated electromagnetic wave has directivity in the first direction and is radiated in a third direction that is perpendicular to the first and second directions.

20. A radar apparatus, comprising:

an antenna device, the antenna device including:

an electromagnetic wave radiation source for radiating an electromagnetic wave, the electromagnetic wave radiation source being a patch antenna or a plane dipole antenna and the electromagnetic wave radiation source extending in a first direction and configured such that the radiated electromagnetic wave has its center axis substantially in a plane extending in the first direction; and an electromagnetic wave shaping module, arranged forward of the electromagnetic wave radiation source, where a plurality of slot array rows each including a plurality of slots arranged in the horizontal direction are arranged in the vertical direction;

the electromagnetic wave shaping module including at least a pair of the slot array rows arranged at positions mutually symmetrical in the second direction with respect to a plane extending in the first direction, said plane including the center axis;

where each slot in a topmost slot array row, and each slot in a bottom-most array row is configured to extract a radiated electromagnetic wave from the electromagnetic wave radiation source; and a reception circuit for processing an echo signal based on the electromagnetic wave discharged from the antenna device.

21. The radar apparatus of claim 20, further comprising a driving device for horizontally rotating the antenna device.

22. The antenna device of claim 20, where each slot in a topmost slot array row, and each slot in a bottom-most array row is configured to extract a radiated electromagnetic wave from the electromagnetic wave radiation source such that the extracted radiated electromagnetic wave has directivity in the first direction and is radiated in a third direction that is perpendicular to the first and second directions.

* * * * *